United States Patent Office 2,993,145
Patented July 18, 1961

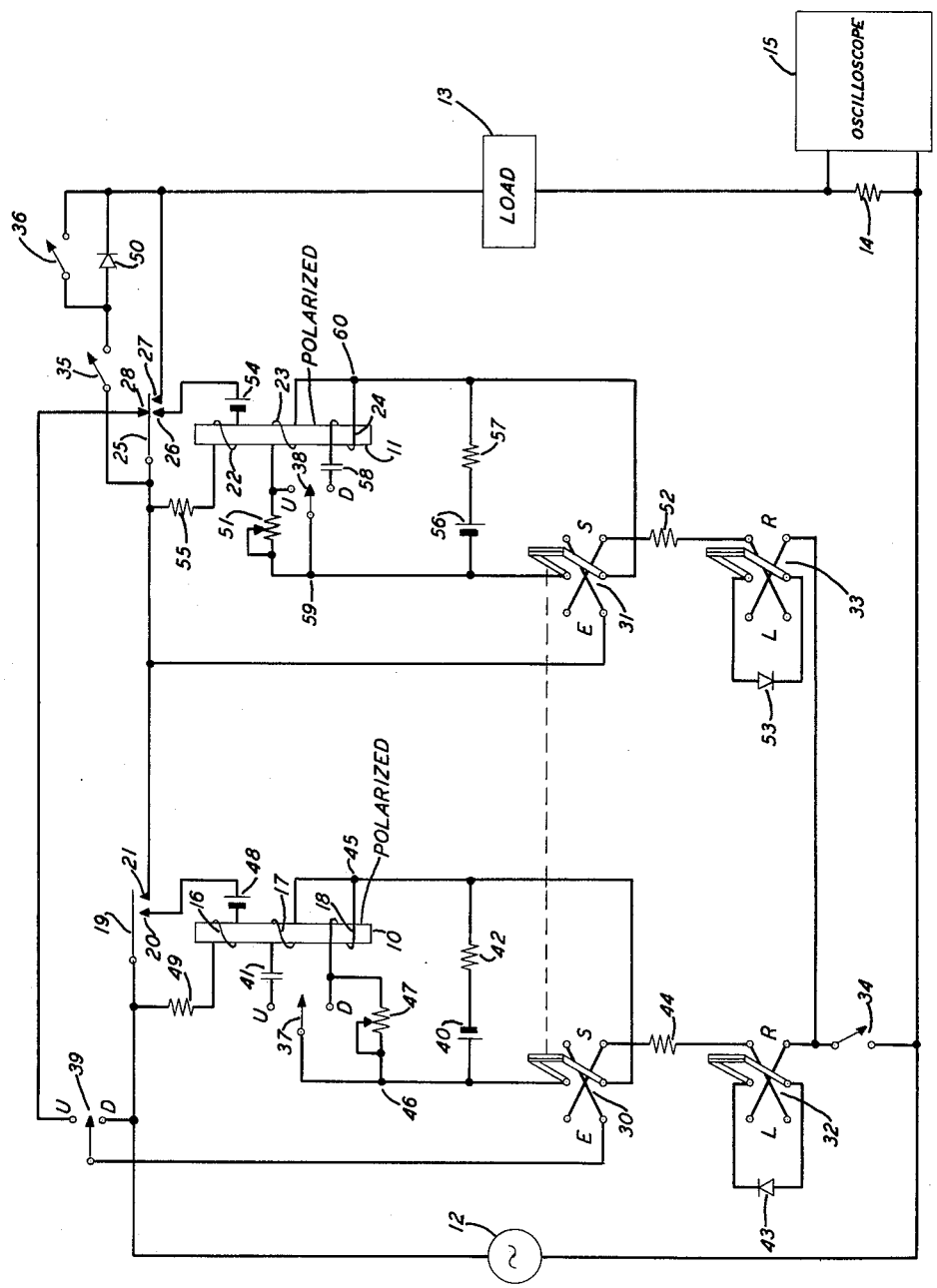

2,993,145
SWITCHING APPARATUS
Eugene A. Berkery, Sayreville, N.J., and Irwin E. Carlen, Brooklyn, N.Y., assignors to Bell Telephone Laboratories, Incorporated, New York, N.Y., a corporation of New York
Filed Apr. 30, 1958, Ser. No. 731,899
7 Claims. (Cl. 317—9)

This invention relates to switching apparatus and more particularly to switching apparatus for opening or closing a circuit for supplying alternating current to a load at a desired time relative to the phase of the alternating wave.

An object of the invention is to provide improved switching means for opening or closing an alternating-current supply circuit at a desired phase angle of the alternating current or voltage wave.

Another object is to provide improved switching means for opening or closing a circuit for energizing a load from an alternating-current supply source at an instant such that the transient current or voltage supplied to the load has a desired amplitude.

The switching circuit is of use, for example, in determining or measuring the maximum current supplied to a load or the maximum voltage set up across a load when the load is connected to or disconnected from a source of alternating current. The load may be any electrical apparatus or circuit to which alternating current or voltage is to be supplied, such as circuits comprising rectifiers, lamps, circuit breakers or fuses, for example. The need for accurately measuring current and voltage transients is very important in designing circuits using diodes or transistors, for example, since such circuits are easily damaged due to momentary overloads of voltage or current. In addition to its use for measuring transient currents and voltages, the switching apparatus may also be used for opening or closing a circuit comprising a load and a source of alternating current at an instant when the alternating voltage or current wave has a predetermined phase angle such that the transient voltage or current is reduced in amplitude or substantially eliminated.

When a load having a highly inductive impedance is connected to or disconnected from an alternating-current supply source, a high amplitude transient current will flow in the circuit, particularly if saturation effects can occur, if it is closed or opened at a substantially zero or 180 degree phase angle of the alternating voltage wave, for example, that is, at an instant when the voltage of the supply source is zero. If, on the other hand, this inductive circuit is opened or closed at a phase angle of substantially 90 degrees or 270 degrees of the alternating voltage wave, that is, at an instant when the voltage has a maximum amplitude, the current in the circuit will have substantially no transient component. In the case of a capacitive load, a high amplitude transient will be produced if the load circuit is opened or closed at a phase angle of 90 degrees or 270 degrees of the alternating voltage wave and there will be produced substantially no transient component if the circuit is opened or closed at a phase angle of zero or 180 degrees of the alternating voltage wave. The amplitude of the transient current in the circuit will depend not only on the phase angle of the alternating voltage wave at the instant that the load circuit is closed or opened but also on the phase angle of the load, that is, the angle whose tangent is the ratio of the load reactance to the load resistance. It will be assumed herein, unless otherwise specified, that the alternating voltage of the supply source is a sine wave having zero amplitude at phase angles of zero, 180 degrees and 360 degrees in any cycle of the wave and having a maximum amplitude of positive polarity at 90 degrees and a maximum amplitude of negative polarity at 270 degrees in any cycle.

In a specific embodiment of the invention, herein shown and described for the purpose of illustration, there is provided a first electromagnetic relay or switch which is operated only when current of a predetermined polarity, negative polarity, for example, is supplied from an alternating-current supply source to a circuit including the relay operating winding. Operation of the first relay completes an energizing circuit for a holding winding of the relay to maintain the relay operated. Operation of the first relay also completes a circuit for supplying current from the supply source to a load, said circuit including a rectifying element which passes only current of a polarity, positive polarity, for example, opposite the polarity of the current required for operating the first relay. A second electromagnetic relay or switch is provided for completing a short-circuiting path across said rectifying element when the second relay is operated. The second relay is caused to operate by current of said opposite or positive polarity supplied to the relay from the alternating-current supply source. There is also provided a holding circuit for the second relay which is completed through a contact of the second relay when operated.

The switching circuit, as described above, causes the load to be connected to the alternating-current supply circuit at an instant when the phase angle of the supply source voltage is zero. The circuit is also adapted for disconnecting the load from the alternating-current supply source at an instant when the alternating voltage wave has a desired phase angle. To accomplish this, the second relay is energized by current of a predetermined polarity, positive polarity, for example, of the alternating wave to cause the second relay to release. After the second relay releases, current continues to be supplied through the rectifying element to the load until the end of the positive half-cycle period. The release of the second relay causes current of opposite polarity, that is, negative, to be supplied to the first relay to cause it to release, thereby disconnecting the supply source from the circuit after the load current has been interrupted by the rectifying device. The load circuit is thus effectively interrupted at an instant when the current flowing through the rectifying element and the load reaches zero amplitude, that is, at the end of a positive half-cycle period of the alternating current.

For the purpose of completing the load circuit at phase angles of the alternating voltage wave other than zero, the current path through the rectifying element in the load circuit is opened so that the load current can flow only through the contact of the second relay when operated. An adjustable delay network is provided for delaying the operation of the second relay for a variable period subsequent to the operaton of the first relay. Accordingly, the load circuit will be closed at a desired instant during a half-cycle period of predetermined polarity, positive, for example, of the alternating voltage wave.

The load circuit may also be interrupted at a desired instant during a half-cycle period of predetermined polarity, negative, for example, of the alternating voltage wave when the alternating wave has a phase angle other than zero or 180 degrees. To accomplish this, a short-circuiting current path across the rectifying element in the load circuit is provided. There is also provided an adjustable delay network for delaying the release of the first relay for a variable period during a half-cycle period of predetermined polarity, negative, for example, of the alternating voltage wave.

The invention will now be described in greater detail with reference to the accompanying drawing, the single figure of which is a schematic view of a switching circuit embodying the invention.

Referring now to the drawing, there is provided a switching apparatus comprising a first polarized electromagnetic relay or switch 10 and a second polarized electromagnetic relay or switch 11 for opening or closing a circuit for supplying current from an alternating-current supply source 12 to a load 13 at a desired phase angle of the alternating voltage or current wave. Any suitable means may be provided for producing an indication of the alternating current supplied to the load or of the alternating voltage across the load. For producing a visual indication of the alternating current wave there may be provided, for example, a resistor 14 of low resistance value in series with the load and an oscilloscope 15 having terminals connected to the terminals of the resistor 14. The relay 10 has three windings 16, 17 and 18, an armature 19 and two contacts 20 and 21. The relay 11 has three windings 22, 23 and 24, an armature 25 and three contacts 26, 27 and 28. There are provided double pole, double throw reversing switches 30 and 31 which are adapted to be closed simultaneously to position S or to position E. There are also provided two reversing switches 32 and 33 which are adapted to be closed to position R or position L. There are further provided three single pole, single throw switches 34, 35 and 36. Three single pole, double throw switches 37, 38 and 39 which may be closed in position U or position D are also provided.

It will be assumed initially that relays 10 and 11 are released, that switches 34 and 36 are open, that switch 35 is closed, that switches 37 and 39 are closed to position D and switch 38 is closed to position U, that switches 30 and 31 are closed to position S and that switches 32 and 33 are closed to position R. Current from a battery 40 will flow through a circuit comprising switch 37, relay winding 18 and a resistor 42, all in series. Switch 34 may now be closed to initiate the operation of the circuit. Current will flow during a negative half-cycle period of the alternating wave from the lower terminal of the supply source 12 through a circuit comprising switch 34, switch 32, a rectifying element 43, a resistor 44 and switch 30, to a common terminal 45 of relay windings 17 and 18. From terminal 45, current will flow through winding 18 to the terminal 46. From terminal 46, the current flows through switches 30 and 39 to the upper terminal of the supply source 12. The current from source 12 flowing through winding 18, when it reaches a sufficient amplitude, will cause the relay 10 to operate.

Operation of relay 10 will complete a circuit comprising a battery 48, contact 20, armature 19, a resistor 49 and relay winding 16, thereby holding the relay operated. At the start of the positive half-cycle period of the alternating wave which follows the negative half cycle during which relay 10 is operated, current from source 12 will commence to flow through a circuit comprising armature 19, contact 21, switch 35, a rectifying element 50, load 13 and resistor 14, all in series. During this positive half-cycle period, current from the source 12 will also flow through a circuit comprising armature 19, contact 21, switch 31, switch 38 which short-circuits a rheostat 51, winding 23, switch 31, a resistor 52, switch 33, a rectifying element 53 and switch 34 to the lower terminal of the source 12. Therefore, relay 11 will operate to cause armature 25 to engage contacts 26 and 27. There is thus completed a circuit comprising a battery 54, contact 26, armature 25, a resistor 55 and relay winding 22 for maintaining relay 11 operated. The closure of contact 27 completes a short-circuiting path across the rectifying element 50. Subsequent to the operation of relay 11, therefore, both positive and negative half cycles of the alternating current from source 12 will be supplied to the load circuit.

When alternating current from the source 12 is being supplied to the load 13, as described above, the circuit may be conditioned for interrupting the load circuit substantially at or near the beginning of a negative half-cycle period of the alternating wave, for example. To accomplish this, switch 34 is opened, switches 30 and 31 are changed to position E and switch 39 is changed to position U. Switch 34 is then reclosed. Changing the switch 31 from position S to position E, reverses the direction of current flow through relay winding 23. This current flows through a circuit comprising armature 19, contact 21, switch 31, winding 23, switch 38, switch 31, resistor 52, switch 33, rectifier 53 and switch 34. The magnetomotive force set up in the core of relay 11 due to current in winding 23 is larger than and opposed to the magnetomotive force set up in the core due to current in winding 22, thereby causing relay 11 to release. When relay 11 is released, current from the source continues to flow during the remainder of the positive half cycle through rectifying diode 50 to the load 13. At the start of the following negative half-cycle period, current from the source 12 will flow from its lower terminal through a circuit comprising switch 34, switch 32, rectifying element 43, resistor 44, switch 30, switch 37, winding 18, switch 30, switch 39, contact 28, armature 25, contact 21 and armature 19 to the upper terminal of the source 12. The current in winding 18 sets up a magnetomotive force in the core of relay 10 which is larger than and opposed to the magnetomotive force set up in the core due to the current in winding 16. The relay 10 is thus caused to release to open the contacts 20 and 21, thereby interrupting the load circuit.

Instead of initiating the supply of current from the alternating-current supply source to the load at the start of a positive half cycle of the alternating wave, the supply of current may be initiated at any other desired instant during a positive half-cycle period of the alternating wave. For this purpose, switch 35 is opened to interrupt the current path through the rectifying diode 50 and switch 34 is also opened initially. Switches 37, 38 and 39 are each closed to the D position and switches 30 and 31 are each closed to the S position. When switch 34 is now closed, current is supplied from the lower terminal of the source 12, during a negative half-cycle period of the alternating wave, to a circuit comprising switch 34, switch 32, rectifying diode 43, resistor 44, switch 30, winding 18, switch 37, switch 30 and switch 39 to the upper terminal of the supply source. Relay 10 will thus operate and will be held operated in response to current supplied to the holding winding 16. Current is supplied from a battery 56 to a circuit comprising a resistor 57, relay winding 23 and rheostat 51, the amplitude of the current in this circuit being adjustable by means of the rheostat 51. Current is also supplied from battery 56 to a circuit comprising winding 24, a condenser 58 and switch 38 for charging the condenser 58. During the positive half-cycle period of the alternating-current wave which follows the operation of relay 10, current is supplied from the upper terminal of the supply source 12 to a circuit comprising armature 19, contact 21, switch 31 to a common terminal 59 of rheostat 51 and of switch 38. A portion of the current flows through rheostat 51 and winding 23 to a common terminal 60 of windings 23 and 24. Another portion of the current flows through condenser 58 and winding 24 to discharge the condenser and to charge it in the reverse direction. From terminal 60, the current flows through switch 31, resistor 52, switch 33, rectifying element 53 and switch 34 to the lower terminal of the supply source 12. The magnetomotive forces set up in the core of relay 11 due to the currents supplied to windings 23 and 24, respectively, are opposed. The charging current of condenser 58 flowing through winding 24 decreases as the condenser becomes charged.

The relay 11 will operate when the current through winding 24 has decreased sufficiently with respect to the current in winding 23. The delay interval separating the time of operation of relay 10 and the time of operation of relay 11 may be adjusted to a desired delay interval by varying the resistance of the rheostat 51 of the delay network which comprises the rheostat 51 and the condenser 58. The load circuit is closed through armature 25 and contact 27 at the instant when relay 11 is operated. At the same time, the circuit through armature 25 and contact 26 is closed to maintain the relay 11 operated. For example, the delay network may be adjusted so that relay 11 operates at the peak of the positive half cycle, that is, when the phase angle of the alternating wave is 90 degrees. If, however, the switches 30, 31 are closed to the E position and switches 32 and 33 are each in position L instead of position R, relay 11 will operate at the peak of the negative half cycle, that is, when the phase angle of the alternating wave is 270 degrees.

To interrupt the load circuit at a desired phase angle of the alternating wave other than zero, switches 35 and 36 are closed, switch 34 is initially opened, switches 30 and 31 are each thrown to position E, switches 32 and 33 are each thrown to position R, and switches 37, 38 and 39 are each thrown to position U. Then, when switch 34 is reclosed, current will flow, during a positive half-cycle period of the alternating wave, from the upper terminal of the supply source 12, through armature 19, contact 21, switch 31, winding 23, switch 38, switch 31, resistor 52, switch 33, rectifying diode 53 and switch 34 to the lower terminal of the supply source. The magnetomotive force set up in the core of relay 11 due to the current in winding 23 is larger than and opposed to the magnetomotive force due to the current in winding 22 and, therefore, the relay 11 is caused to release. During the negative half-cycle period of the alternating wave, following the positive half-cycle period in which relay 11 is released, current will flow from the lower terminal of the supply source 12, through a circuit comprising switch 34, switch 32, rectifying diode 43, resistor 44 and switch 30 to terminal 46. The current then divides, a portion passing through switch 37, condenser 41 and winding 17 to terminal 45 to charge the condenser and another portion flowing through rheostat 47 and winding 18 to terminal 45. From terminal 45, the circuit continues through switch 30, switch 39, contact 28, armature 25, contact 21 and armature 19 to the upper terminal of the supply source. The current flowing through winding 18 produces in the core of relay 10 a magnetomotive force which is larger than and opposed to the magnetomotive force set up in the core by the current in winding 16. When the charging current of condenser 41, flowing through winding 17, has decreased sufficiently in relation to the current flowing through winding 18, as determined by the setting of rheostat 47, relay 10 will release to open contacts 20 and 21.

The load circuit will thus be opened at a desired instant during a negative half-cycle period of the alternating wave as determined by the setting of rheostat 47 of the delay network, that is, at a phase angle greater than 180 degrees and less than 360 degrees. If desired, each of the switches 32 and 33 may be closed to the L position, rather than the R position, and switches 30 and 31 may be closed to the S position. In this case, relay 11 will be released during a negative half-cycle period of the alternating wave and relay 10 will be released during a positive half-cycle period of the alternating wave. The rheostat 47 may be adjusted to cause the load circuit to be opened at a desired instant when the phase angle of the alternating wave is greater than zero and less than 180 degrees.

What is claimed is:

1. Switching apparatus for supplying current to a load comprising a source of alternating current, first and second switching devices, an asymmetrically conducting device, means coupled to said alternating-current source for providing a first unidirectional current having a predetermined magnitude, means coupled to said alternating-current source for providing a second unidirectional current having a magnitude other than that of said first unidirectional current, said asymmetrically conducting device being poled to conduct current only when half cycles of said other magnitude are supplied by said alternating-current source, a holding circuit for said first switching device, means responsive to said first unidirectional current for actuating said first switching device, means responsive to the actuation of said first switching device for energizing said holding circuit to maintain said first switching device actuated, means responsive to the actuation of said first switching device for connecting said asymmetrically conducting device between said alternating-current source and said load to transmit current to said load, means responsive to said second unidirectional current for actuating said second switching device, means responsive to the actuation of said second switching device for short-circuiting said asymmetrically conducting device.

2. Switching apparatus for supplying current to a load comprising a source of alternating current, first and second switching devices, first and second switch members serially connected between said source and said load, means coupled to said alternating-current source for providing a first unidirectional current having a predetermined magnitude, means coupled to said alternating-current source for providing a second unidirectional current having a magnitude other than that of said first unidirectional current, a first holding circuit for said first switching device, a second holding circuit for said second switching device, means responsive to said first unidirectional current for actuating said first switching device, means responsive to the actuation of said first switching device for energizing said first holding circuit to maintain said first switching device actuated, means responsive to said second unidirectional current for actuating said second switching device, means responsive to the actuation of said second switching device for energizing said second holding circuit to maintain said second switching device actuated, and means responsive to the actuation of both said first and second switching devices for actuating said first and second switch members to complete a circuit for transmitting current from said alternating-current source to said load.

3. Switching apparatus in accordance with claim 2 wherein said means responsive to said second unidirectional current comprises adjustable means for delaying the actuation of said second switching device.

4. Switching apparatus for supplying current to a load comprising a source of alternating current, first and second electromagnetic relays, first and second switch members serially connected between said source and said load, means coupled to said alternating-current source for providing a first unidirectional current having a predetermined magnitude, means responsive to said first unidirectional current for causing said first relay to operate, means responsive to the operation of said first relay for holding said first relay operated, circuit means completed in response to the operation of said first relay for transmitting from said alternating-current source to said load only unidirectional current having a magnitude other than that of said first unidirectional current, means responsive to the operation of said first relay for supplying from said alternating-current source to said second relay unidirectional current having said other magnitude to cause said second relay to operate, means responsive to the operation of said second relay for holding said second relay operated, means responsive to the operation of both said first and second relays for actuating said first and second switch members to complete a circuit for transmitting alternating current from said source to said load.

5. Switching apparatus for supplying current to a load comprising a source of alternating current, first and second electromagnetic relays, first and second switch members serially connected between said source and said load, means coupled to said alternating-current source for providing a first unidirectional current having a predetermined magnitude, means responsive to said first unidirectional current for causing said first relay to operate, means responsive to the operation of said first relay for holding said first relay operated, means responsive to the operation of said first relay for completing a circuit for supplying from said alternating-current source to said second relay unidirectional current having a magnitude other than that of said first unidirectional current to cause said second relay to operate, adjustable means in said circuit for delaying the operation of said second relay for a delay interval following the operation of said first relay, means responsive to the operation of said second relay for holding said second relay operated, and means responsive to the operation of both said first and second relays for actuating said first and second switch members to complete a circuit for supplying current from said alternating-current source to said load.

6. Switching apparatus comprising a source of alternating current, a load, first and second relays, a first circuit coupled to said alternating-current source for providing a first unidirectional current having a predetermined magnitude, means responsive to said first unidirectional current for causing said first relay to operate, holding means for said first relay, means responsive to the operation of said first relay for energizing said holding means to hold said first relay operated, means responsive to the operation of said first relay for completing a second circuit for supplying from said alternating-current source to said second relay a second unidirectional current having a magnitude other than that of said first unidirectional current to cause said second relay to operate, holding means for said second relay, means responsive to the operation of said second relay for energizing said holding means to hold said second relay operated, means responsive to the operation of both said first and second relays for completing a circuit for supplying current from said alternating-current source to said load, means for reversing the direction of flow of said second unidirectional current, means responsive to said reversed second unidirectional current for de-energizing said second relay holding means and thereby releasing said second relay, means for reversing the direction of flow of said first unidirectional current, means responsive to the release of said second relay for completing a third circuit for supplying from said alternating-current source to said first relay said first unidirectional current flowing in said reversed direction, means responsive to said reversed first unidirectional current for de-energizing said first relay holding means and thereby releasing said first relay.

7. Switching apparatus in accordance with claim 6 wherein said third circuit comprises adjustable means for delaying the de-energization of said first relay holding means and the release of said first relay.

References Cited in the file of this patent

UNITED STATES PATENTS

| | | |
|---|---|---|
| 2,412,092 | Mayle | Dec. 3, 1946 |
| 2,642,540 | Berindei | June 16, 1953 |
| 2,809,296 | Godbasen | Oct. 8, 1957 |
| 2,849,659 | Kesselring | Aug. 26, 1958 |
| 2,859,400 | Kesselring | Nov. 4, 1958 |